Aug. 7, 1945.  T. HELLEBERG ET AL  2,381,821
DEVICE FOR DETERMINING THE VOLUME OF GAS OR LIQUID IN RECEPTACLES
Filed Dec. 4, 1944
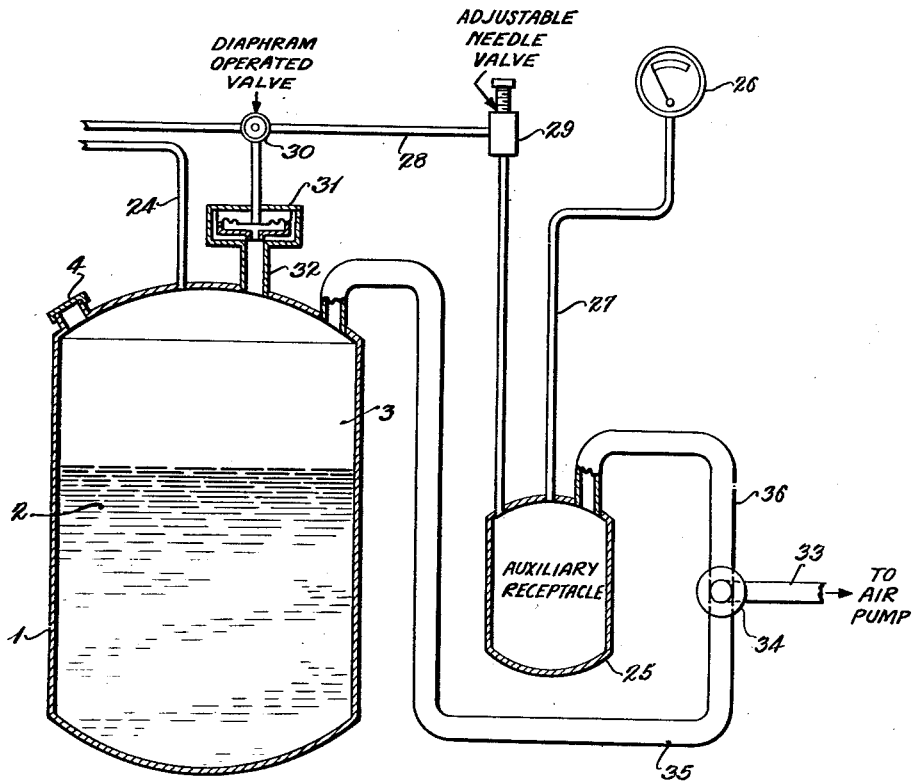
Inventors
TORE HELLEBERG AND
SVEN MALMSTRÖM
By Stevens and Davis
Attorneys Patented Aug. 7, 1945

2,381,821

UNITED STATES PATENT OFFICE 2,381,821

DEVICE FOR DETERMINING THE VOLUME OF GAS OR LIQUID IN RECEPTACLES

Tore Helleberg, Stockholm, and Sven Malmström, Linkoping, Sweden

Application December 4, 1944, Serial No. 566,482
In Sweden October 25, 1940

2 Claims. (Cl. 73—290)

The present invention relates to a device for determining the volume of gas or liquid in a receptacle, which is filled partly with a liquid and for the rest with a gas, e. g., air.

According to the invention, the said device comprises not only the said receptacle (main receptacle), but also an auxiliary receptacle of known volumetric capacity, which receptacle is connected with one side of a manometer, the other side of which is open to atmosphere, as well as means for establishing equal gas pressures in both receptacles different from the atmospheric pressure, whereby a restricted communication can be established between the two receptacles, and the atmosphere and the means for establishing the restricted communication between the auxiliary receptacle and the atmosphere are combined with a normally closed valve, which is biased to open position by means responsive to pressure in the main receptacle in excess of atmospheric pressure, e. g., by means of a diaphragm operatively connected to the valve, one side being open to the atmosphere and the other side of which being responsive to the gas pressure in the main receptacle.

An embodiment of the device according to the invention is illustrated in the accompanying single figure of drawing.

The recepatcle 1 is filled partially with a liquid 2 and the remaining space with a gas 3 and is connected with the atmosphere by means of a pressure equalizing pipe 24, and an auxiliary receptacle 25 filled with gas is connected by means of a pipe 27 with a manometer 26 which indicates the pressure of gas in the auxiliary receptacle 25, i. e., the difference between the pressure of the gas in the receptacle 25 and the atmospheric pressure, and with the atmosphere by means of a pressure equalizing pipe 28 containing an adjustable needle valve 29 and a stop-valve 30. A diaphragm device 31 is connected with the valve 30 and by means of a pipe 32 with the receptacle 1. The diaphragm is influenced by the difference between the pressure of gas in the receptacle 1 and the atmospheric pressure. The valve 30 is so coupled with the diaphragm device 31 that the valve 30 is only opened if this difference of pressure rises above a certain value. An air pump not illustrated in the drawing is connected with the receptacles 1 and 25 by means of a pipe 33 containing a stop-valve 34 and by means of branch-pipes 35, 36.

The volume of gas in the receptacle 1 is determined in the following manner by measuring the time that passes till a certain value of the difference of pressure is reached.

The valve 34 is opened, and the pump is worked until a certain vacuum or pressure exists in the receptacle 25. It is necessary that the capacity of the pump be considerable, compared with the velocity of flow through the pipes 24 and 28, so that the pressure or the vacuum can be the same in the receptacles 1 and 25. If the manometer 26 indicates the desired pressure, the valve 34 is closed, and the equalization of the difference between the pressure of gas in the receptacles 1, 25 and the atmospheric pressure begins. If the difference between the pressure in the receptacle 1 and the atmospheric pressure is reduced to the fixed value, the valve 30 is closed by the diaphragm device 31 so that the difference of pressure cannot decrease further. This value indicated by the manometer 26 depends directly on the volume of gas contained in the receptacle 1, according to the thermodynamic laws, because it is a measure for the time that passes in order that the difference between the pressure in the receptacle 1 and the atmospheric pressure decreases to the value at which the valve 30 is closed by the diaphragm device 31, and because this time depends directly on the volume of gas in the receptacle 1. As the ratio between the difference of pressure and the quantity of gas flowing through the pipes 24 and 28 in the unit of time is the same for these pipes, the measured value is not dependent on the present atmospheric pressure and the present temperature.

Having now particularly described the nature of our invention and the manner of its operation what we claim is:

1. A device for determining the volume of liquid in a main receptacle containing a liquid and a gas under pressure, which comprises an auxiliary receptacle of known volumetric capacity, means for establishing equal gas pressures in said receptacles different from atmosphere, means establishing restricted communication between said main receptacle and atmosphere, means establishing restricted communication between said auxiliary receptacle and atmosphere, a normally closed valve in said last named means, means responsive to pressure in said main receptacle in excess of atmospheric pressure for biasing said valve to open position, a manometer, means connecting one side of said manometer to said auxiliary receptacle, the other side thereof being open to atmosphere.

2. A device as claimed in claim 1 in which the means for biasing said valve to open position is a diaphragm operatively connected thereto, one side of which is open to atmosphere and the other side of which is responsive to the gas pressure within the main receptacle.

TORE HELLEBERG.
SVEN MALMSTRÖM.